US008806030B2

(12) United States Patent
Zhu et al.

(10) Patent No.: US 8,806,030 B2
(45) Date of Patent: Aug. 12, 2014

(54) MULTICHANNEL CONNECTIONS IN FILE SYSTEM SESSIONS

(75) Inventors: Qibo Zhu, Sammamish, WA (US); David M. Kruse, Kirkland, WA (US); Mathew George, Bellevue, WA (US); MingDong (Gary) Shang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 12/960,577

(22) Filed: Dec. 6, 2010

(65) Prior Publication Data
US 2012/0144019 A1 Jun. 7, 2012

(51) Int. Cl.
G06F 15/173 (2006.01)

(52) U.S. Cl.
USPC .......................................................... 709/228

(58) Field of Classification Search
None
See application file for complete search history.

(56) References Cited

U.S. PATENT DOCUMENTS

| 5,301,280 | A  | * | 4/1994  | Schwartz et al. ............. 709/237 |
| 5,812,784 | A  |   | 9/1998  | Watson et al. |
| 6,085,234 | A  | * | 7/2000  | Pitts et al. ..................... 709/217 |
| 6,470,390 | B1 | * | 10/2002 | Westfield ...................... 709/227 |
| 6,549,934 | B1 |   | 4/2003  | Peterson et al. |
| 6,795,851 | B1 |   | 9/2004  | Noy |
| 7,174,534 | B2 |   | 2/2007  | Chong et al. |
| 7,526,558 | B1 | * | 4/2009  | Pittman ......................... 709/227 |
| 2002/0034282 | A1 | * | 3/2002 | Tang ........................... 379/90.01 |
| 2006/0271697 | A1 | * | 11/2006 | Kruse et al. .................. 709/230 |
| 2006/0282545 | A1 | * | 12/2006 | Arwe et al. ................... 709/237 |
| 2007/0185991 | A1 | * | 8/2007  | Ofir et al. ..................... 709/224 |
| 2008/0209050 | A1 |   | 8/2008  | Li |
| 2009/0319660 | A1 | * | 12/2009 | Cavalaris et al. ............. 709/225 |
| 2009/0327502 | A1 |   | 12/2009 | Brewer et al. |
| 2010/0057932 | A1 | * | 3/2010  | Pope et al. ................... 709/236 |
| 2010/0332665 | A1 | * | 12/2010 | Jolfaei ......................... 709/228 |
| 2011/0276699 | A1 | * | 11/2011 | Pedersen ..................... 709/227 |
| 2012/0117247 | A1 | * | 5/2012  | Carruthers ................... 709/226 |

OTHER PUBLICATIONS

PCT International Search Report and Written Opinion mailed Jul. 18, 2012, 9 pgs.
Taubman, et al, "Architecture, Philosophy and Performance of JPIP: Internet Protocol Standard for JPEG2000", Retrieved at <<http://citeseerx.istpsu.edu/viewdoc/download?doi=10.1.1.88.2758&rep=rep1&type=pdf>>, Visual Communications and Image Processing, vol. 5150, No. 1, 2003, pp. 15.

(Continued)

Primary Examiner — Chirag Shah
Assistant Examiner — Rina Pancholi
(74) Attorney, Agent, or Firm — Henry Gabryjelski; Kate Drakos; Micky Minhas

(57) ABSTRACT

A multi-connection information system is described herein that uses multiple connections to connect to a resource in a single file system session in a way that is controllable from protocols above a transport layer. The system also allows a single connection to be shared by multiple sessions. Sessions can be bound to multiple connections to enable communication over multiple transports. During the initial negotiation of a session, a client and a server determine whether multiple connections are supported between the client and the server within a session. After establishing an initial connection, additional connections can be established and bound to the existing session. The multiple connections can be used for failover and/or load balancing. The multi-connection information system provides a protocol for discovering a capability to establish multiple channels within a session and information about the available connections between two particular resources.

20 Claims, 5 Drawing Sheets

(56) References Cited

OTHER PUBLICATIONS

"The KeyWorx platform", Retrieved at <<http://www.keyworx.org/>>, Retrieved Date: Oct. 8, 2010, pp. 3.
"iSCSI Multiple Connections per Session(MC/S) with Comstar iSCSI", Retrieved at <<http://www.c0t0d0s0.org/archives/6551-iSCSI-Multiple-Connections-per-Session-MCS-with-Comstar-iSCSI.html>>, May 12, 2010, pp. 2.
"Network Load Balancing and stateful connections", Retrieved at <<http://technet.microsoft.com/en-us/library/cc757745(WS.10).aspx>>, Retrieved Date: Oct. 11, 2010, p. 1.
Schroeder, et al., "Scalable Web Server Clustering Technologies", Retrieved at <<http://www.cse.unl.edu/~goddard/Papers/Journals/IEEENetwork.pdf>>, IEEE Network, May-Jun. 2000, p. 38-45.
China Application 201110416650.0, Office Action mailed Apr. 3, 2014, 11 pages.

\* cited by examiner

MULTICHANNEL CONNECTIONS IN FILE SYSTEM SESSIONS

BACKGROUND

A variety of techniques exists for sharing files, printers, and other resources between two computers on a network. For example, one application-layer network protocol for sharing resources is Server Message Block (SMB). SMB is used by MICROSOFT™ WINDOWS™ and other operating systems to allow two computers or other resources to communicate, request access to resources, specify intended access of resources (e.g., reading, writing, etc.), lock resources, and so on. MICROSOFT™ WINDOWS™ Vista introduced SMB 2.0, which simplified the command set of SMB 1.0 and added many other enhancements. MICROSOFT™ WINDOWS™ 7 and Server 2008 R2 introduced SMB 2.1, which added opportunistic locking (oplocks) and other enhancements.

Most protocols for remote sharing of resources assume a one-to-one relationship between connections and sessions. A session represents the lifetime of any single request to access a resource and the subsequent access of that resource until the connection is terminated. A session may also be associated with a particular security principal and validated security credentials that determine the actions that are authorized during the session. A connection can include a Transmission Control Protocol (TCP) or other type of connection over which higher-level protocols like SMB can communicate to carry out commands. An SMB session typically involves opening a TCP connection between a source of a request and a target of the request, sending one or more SMB commands to access the target resource, and then closing the session.

Many computers today are connected in such a way that there are multiple available connections between the computers. For example, datacenter servers are often built with two or more Network Interface Cards (NICs) so that if one fails network traffic can be sent over the other one. Client computers may include a wireless network connection (Wi-Fi), a Bluetooth connection, a wired Ethernet (e.g., Local Area Network (LAN)) connection, and so forth. Server computers may include a storage area network (SAN), connections via Fibre Channel, wired Ethernet, and so forth. Some or all of these connections may provide connectivity to some or all of the same resources.

Unfortunately, the available connection information is generally unavailable to an application or application layer protocols that use the network. An application that requests a connection to a server will typically hand all responsibility for choosing the device/protocol over which to make the connection to a lower-level network layer, and the network layer will make a single connection to carry out the application's commands. If the connection fails, the application or network layer may try another connection by setting up the session again or may involve manual intervention to do so. Use of a single connection leads to a fragile connection that is terminated if the connection fails for any reason, and is unable to leverage the aggregate bandwidth provided by multiple networks. Some protocols, like the Network File System (NFS) include parallelization extensions (e.g., pNFS) that allow for use of redundant paths to data to improve throughput, but these do not provide any information to higher levels that can be used to manage the connection. Another example is the experimental Multipath TCP (MPTCP) protocol that has a specific goal of remaining undetected to higher layers for backwards compatibility. The function of these protocols is completely out of the control of higher layers, and the network layer may not automatically select the fastest connection on its own or provide the most efficient use of connections for failover, throughput, or other purposes.

SUMMARY

A multi-connection information system is described herein that uses multiple connections to connect to a resource in a single file system session in a way that is controllable from protocols above a transport layer, such as the SMB application-layer protocol. The system may also allow a single connection to be shared by multiple sessions. The concept of a channel is introduced to represent the binding of a particular session to a particular connection. Sessions can be bound to multiple connections to enable communication over multiple transports. During the initial negotiation of a session, a client and server can determine whether multiple connections are supported between a client and a server within a session. After establishing an initial connection, additional connections can be established and bound to the existing session. The multiple connections can be used for failover and/or load balancing. The multi-connection information system provides a protocol for discovering a capability to establish multiple channels within a session. The protocol provides information about the available connections between two particular resources as well as whether the server side and client side of the connection supports multiple channels within a session. Thus, the multi-connection information system provides a way to intelligently select and use multiple connections for a single session at layers above the transport layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A multi-connection information system is described herein that uses multiple connections to connect to a resource in a single file system session in a way that is controllable from protocols above a transport layer in the Open Systems Interconnection (OSI) model, such as the SMB application-layer protocol. The system may also allow a single connection to be shared by multiple sessions. The concept of a channel is introduced to represent the binding of a particular session to a particular connection. Sessions can be bound to multiple connections to enable communication over multiple transports. During the initial negotiation of a session, a client and server can determine whether multiple connections are supported between a client and a server within a session. After establishing an initial connection, additional connections can be established and bound to the existing session. The multiple connections can be used for failover and/or load balancing. The multi-connection information system provides a protocol for discovering a capability to establish multiple channels within a session. The protocol provides information about the available connections between two particular resources as well as whether the server side and client side of the connection supports multiple channels within a session.

During the establishment of an initial session between a client and a server (e.g., an SMB client and server), a negotiation occurs to indicate that both the client and server support multiple connections within a session. This may include negotiating a protocol version that provides support for multiple connections. The client can invoke a file system control message (FSCTL) or other application-programming interface (API) to obtain a list of server transport interfaces. In alternative embodiments, the client can query a DNS service to get more information on server network interfaces and capabilities. The client can also find the local interfaces associated with each server IP address and gather additional information about local interfaces, including type and speed. The client can then select an interface for establishing an initial connection. In some embodiments, the client establishes the initial connection first and then uses that connection for negotiating information with the server about other available transports. For the establishment of additional channels, the client can sort the multiple interfaces by type and speed to determine the top interfaces and establish additional channels using the top interfaces. After the client has established multiple channels, some channels that are not in the top interfaces can optionally be torn down (or simply not used) in favor of using channels that are ranked higher based on type and speed. Thus, the multi-connection information system provides a way to intelligently select and use multiple connections for a single session at layers above the transport layer.

Figure 1:
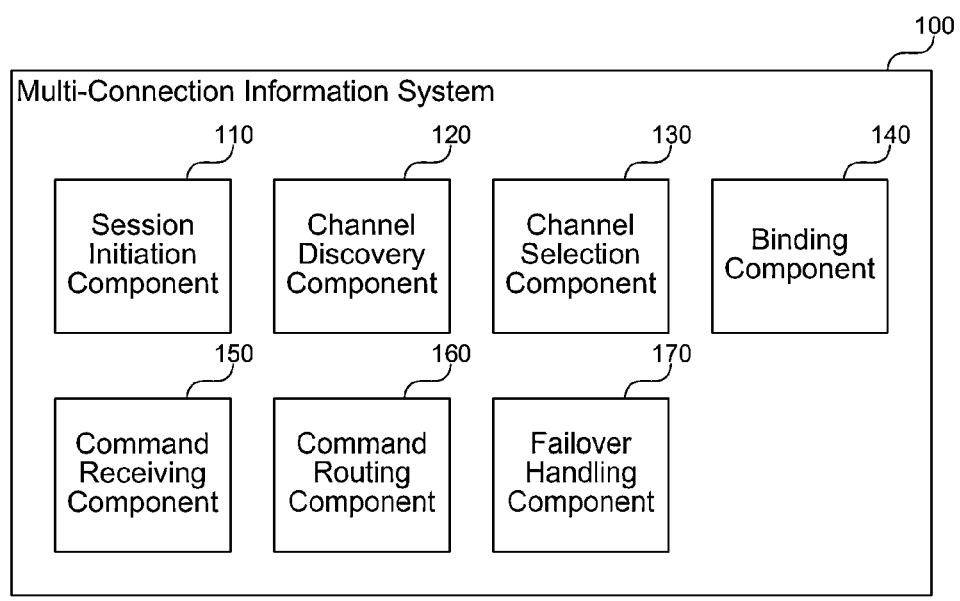
FIG. 1 is a block diagram that illustrates components of the multi-connection information system, in one embodiment.

FIG. 1 is a block diagram that illustrates components of the multi-connection information system, in one embodiment. The system 100 includes a session initiation component 110, a channel discovery component 120, a channel selection component 130, a binding component 140, a command receiving component 150, a command routing component 160, and a failover handling component 170. Each of these components is described in further detail herein.

The session initiation component 110 receives requests to initiate a session between a client and server for sharing one or more resources. For example, the component 110 may receive a request from an application running on a client that identifies a server to which the application wants to connect to access files or other resources. The session initiation component 110 may receive an SMB initial request, such as a "Negotiate" message that opens communications between a client and server. The session initiation component 110 creates sessions in response to application requests and may provide security information, such as a request user's authentication information, so that the server can respect any restricted network access to resources.

The channel discovery component 120 determines one or more connection transports that are available for communication between the client and server. Clients and servers may be connected by a variety of transports, such as Ethernet and Wi-Fi, as well as redundant connections of the same transport, such as two Ethernet NICs. In addition, some connection transports may support capabilities, such as Remote Direct Memory Access (RDMA) that affect the speed of one connection transport over another. The channel discovery component 120 gathers this type of information and collects the information for the client to use in selecting an appropriate transport. The component 120 may use an initial connection to the server to identify server transport interfaces and negotiate multiple channels for connections. The component 120 may also gather information outside the client and server, such as querying a DNS server for information about connection types available to the server.

The channel selection component 130 selects one or more connection transports from the determined available connection transports to bind to the session between the client and the server. In some cases, the client will establish a first connection to the server, and then upon discovering that some condition exists, will use information discovered via the first connection to later establish additional connections to the server. For example, the condition may include detecting that the client is sending a large amount of data to the server that will take a long time over the initial connection. The condition may also include determining that the client has a high expectation of reliability for the session between the client and server, such that redundant connections may be helpful for failover. The channel selection component 130 can be modified or configured by an application or particular implementation of the system 100 to select connections based on goals and priorities that are significant to the particular implementation. For example, some implementations may favor making connections over the fastest transport connections first, while others may reserve fast connections for certain types of network traffic and use slower or lower priority connections for other types of traffic.

The binding component 140 associates the selected connection transports with the session. A session captures information about a security principal associated with a particular series of communications between the client and server. The session may also contain other metadata that defines capabilities or commands available for the particular series of communications. Binding a selected connection transport to the session makes that connection transport available for use for that session, and may negotiate any security credentials or other exchange with the server to prepare the connection for use with the session. Note that just as a single session may bind to multiple connections, multiple sessions may also bind to a particular connection. The connection provides the conduit over which communications travel between the client and server while the session gives each communication semantic meaning in the context of what the application layer is trying to accomplish or is allowed to do.

The command receiving component 150 receives one or more commands related to a session between the client and the server. The purpose of being able to communicate between the client and server is for the client to send commands to access resources. For example, the client may send an "open" request to open a file or a "lock" request to prevent others from accessing a file while the client modifies the file. The command receiving component 150 receives these commands and invokes the command routing component 160 to determine one or more transports over which to send the command. In some embodiments, the system 100 guarantees that a response will be sent over the same transport connection over which a corresponding request was sent. Thus, by routing a particular command to a particular transport connection, the client can also select how data related to the request will be returned to the client. For large data and varying connection speeds, selecting appropriately can dramatically affect the overall duration of the operation.

The command routing component 160 selects a connection transport bound to a session over which to send a particular command. The command routing component 160 split commands up and use multiple transports to carry out the command, such as for retrieving large files or sending large files. The component 160 may also select fast connection transports for some commands while selecting slower or less frequently utilized connection transports for lower priority commands. The command routing component 160 may also determine that additional available transport connections should be bound to the session, such as upon receipt of a request to transfer a large file that will be too slow over the existing bound connections. The command routing component 160 may also detect imminent connection maintenance or outages and cause additional connections to be made to ensure reliability.

The failover handling component 170 handles a disconnection of a particular transport connection from the session. For example, a network wire could be cut, a NIC could fail, or other conditions could lead to a connection that worked previously being disconnected. The failover handling component 170 determines whether other connections are available, and may invoke other components, such as the channel discovery component 120 to select additional channels and the command routing component 160 to route commands to a non-disconnected connection. The failover handling component 170 may also handle replaying any commands that were queued on the disconnected connection transport and waiting for the server's responses over another transport connection so that the commands are carried out reliably in spite of the failure. In this way, the system 100 provides higher reliability.

The computing device on which the multi-connection information system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
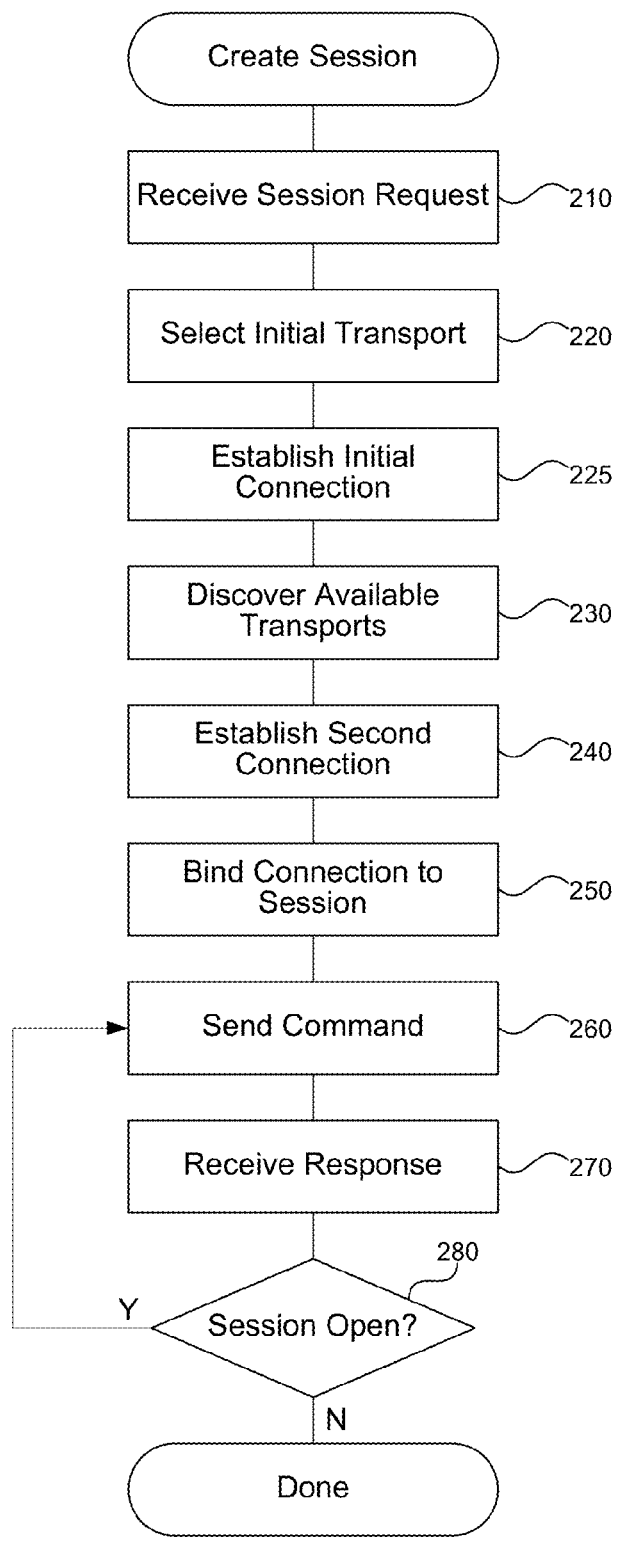
FIG. 2 is a flow diagram that illustrates processing of the multi-connection information system to initiate a session and receive transport information, in one embodiment.

FIG. 2 is a flow diagram that illustrates processing of the multi-connection information system to initiate a session and receive transport information, in one embodiment. Beginning in block 210, the system receives from an application a request to initiate a session between a client and a server. The application may include operating system components or other service-level applications, as well as typical client applications. Many types of applications and services connect to a server to share files, printers, or other resources. Upon receiving the request, the system begins setting up a session and may send one or more packets to the server to negotiate available dialects of the network protocol used to communicate between the client and server, as well as to detect other capabilities of the client and server to ensure compatibility. During this process, the server may indicate that it supports multi-connection sessions so that the client can leverage the techniques described herein to increase throughput, improve failover, and so forth.

Continuing in block 220, the system selects an initial transport for sending commands between the client and server. The system may default to one type of transport for the first connection, such as an Ethernet connection on a first NIC, or may select based on application-specified criteria. The criteria may indicate to select the fastest connection, the connection with the highest bandwidth, the most robust connection, or any other criteria helpful to the application. Continuing in block 225, the client establishes an initial connection to the server. Because the client and server share information about available transports, the client is able to choose an appropriate connection for any particular session.

Continuing in block 230, the system determines one or more available transports for establishing a second connection between the client and the server. The system has both internal and external means of determining the available transports. External means are those outside of the client/server connection, such as querying a separate DNS server, datacenter metadata, or other information. Internal means are those within the connection between the client and the server, such as sending a capabilities request or query to identify available devices and transports. The client can identify local transports by querying the client operating system or by querying the server over the initial connection. The multi-channel information system compiles a list of available transports and any metadata discovered about the transports that may help in determining under what conditions to use each transport.

Continuing in block 240, the system establishes a second connection via the selected transport. For example, if the protocol is SMB, then the client may send a negotiate message over the selected transport that sets up an SMB connection. Individual connections may appear as they do in systems today, with the bind step combining the single connections into a single session. Establishing the connection may involve several packets going back and forth between the client and server to perform any connection setup and gather any metadata needed for using the connection.

Continuing in block 250, the system binds the established second connection to the session of the initial connection. Binding informs the system that the session is affiliated with the connection and that the system can use the connection for sending commands. The system may track which connections are bound to which sessions, so that as sessions close or connections disconnect, the system can clean up appropriately. After all sessions that use a connection have ended, the system can close the connection. Similarly after all connections have disconnected that are bound to a session, the system can clean up the session.

Continuing in block 260, the system sends a command received from the application through either established connection bound to the session. The system may select among multiple such connections to choose a connection suited to the current command. The system may consider bandwidth, latency, current queue depth, battery power (e.g., for a mobile device), priority, or any other factors to select the connection for handling the command. The system may also split the command to use multiple connections concurrently to speed up operations. Continuing in block 270, the system receives a response to the sent command via the same transport used to send the command. The received response may indicate whether the command was successful, may include requested data, or any other response defined for a particular request.

Continuing in decision block 280, if there are more commands or the session has not been closed, then the system loops to block 260 to send more commands, else the system completes. The system continues in this way, sending commands associated with a session over available connections. If at any point the system determines that additional connections would be helpful to carry out commands, then the system may establish and bind additional connections to the session for commands to use. After block 280, these steps conclude.

Figure 3:
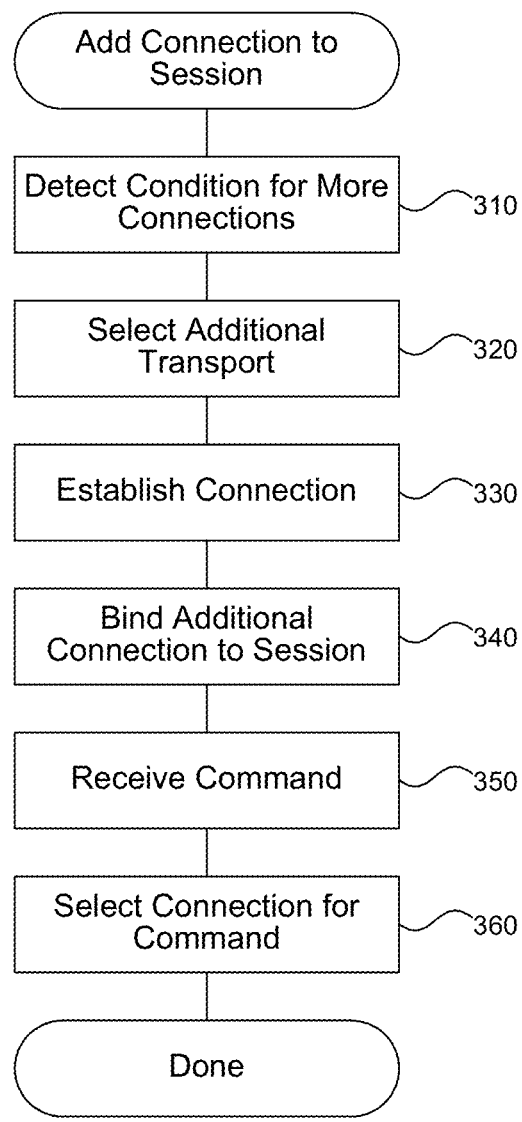
FIG. 3 is a flow diagram that illustrates processing of the multi-connection information system to add an additional connection to a previously established session, in one embodiment.

FIG. 3 is a flow diagram that illustrates processing of the multi-connection information system to add an additional connection to a previously established session, in one embodiment. The steps of FIG. 3 may occur after those of FIG. 2 after a particular condition is detected or a threshold is reached for expanding a session from a single connection to multiple connections. For example, the system may detect a large file transfer that would complete faster over multiple connections.

Beginning in block 310, the system detects a condition for establishing an additional connection for a previously established session that already has at least one bound connection between a client and a server. The condition may include exceeding the bandwidth of existing connections, latency too high on existing connections, wanting additional bandwidth for an upcoming command requesting or sending large data, and so on. Upon detecting the condition, the system performs the following steps to add additional connections to the session.

Continuing in block 320, the system selects an additional transport from a previously discovered list of transports. The system may discover the transports through a capabilities request to the server, by querying DNS information, or any other mechanism for discovering ways to connect the client and server. The system may sort the available transports and/or select a transport based on characteristics received during discovery. For example, the system may prefer a connection with a high bandwidth, a connection with high availability, a connection that is currently idle, and so forth.

Continuing in block 330, the system establishes a connection via the selected transport. Establishing a connection may include establishing a transport layer connection, such as via TCP/IP, as well as session protocol negotiation, such as an SMB negotiate sequence. The system may also exchange metadata over the established connection to confirm the connection type and receive any setup information for using the connection (e.g., whether the connection supports certain features, such as selective acknowledgements, and so on).

Continuing in block 340, the system binds the newly established connection to the existing session, so that the session has multiple available connections from which to select when sending commands. Binding may associate a connection that is already associated with another session to the current session, so that both sessions can leverage the connection. Binding also informs the session about the connection, so that if the session closes session management logic can perform appropriate cleanup steps to unbind and/or close the connection.

Continuing in block 350, the system receives an application-level command destined for the server to which there are now multiple connections. An application may request to open a file, request to print to a shared printer, or perform other common shared, remote usage of a resource. The operating system or other service code may provide one or more application programming interfaces (APIs) through which applications can invoke the system to send commands to the server.

Continuing in block 360, the system selects one or more transports among the newly established connections and one or more previous connections over which to send the received command. The system may route commands to a default connection unless one or more threshold criteria are met, such as a request for a large amount of data. Upon receiving a larger request, the system may select a higher bandwidth connection or split the command to use multiple connections to complete the operation specified by the command faster. As another example, the system may detect when a connection goes down and use alternate connections as a method of smooth failover transparent to an application. After block 360, these steps conclude.

In some embodiments, the multi-connection information system provides a file system API within an operating system through which applications or services at a client can request information about available network interfaces of a remote server. For example, MICROSOFT™ WINDOWS™ uses file system control messages (FSCTLs) for interacting with one or more file systems. The system may add a message, FSCTL_LMR_QUERY_TRANSPORT_INFO that is a command for requesting active network interfaces of the remote server. One structure that a server may provide in response to this command includes the following members described in further detail below: Next (4 bytes), IfIndex (4 bytes), Capability (4 bytes), RssQueueCount (4 bytes), LinkSpeed (8 bytes), SockAddr_Storage (128 bytes).

The Next member provides the offset from the beginning of the current structure to the beginning of a subsequent 8-byte aligned network interface. The Next member is set to zero as a null terminator when no further network interfaces follow. The IfIndex member provides a numerical index for the current network interface. The Capability member contains flags that indicate capabilities of the current network interface, such as whether the interface is RDMA or Receive Scaling Support (RSS) capable. The RssQueueCount member indicates an RSS queue count for RSS capable interfaces. In some cases, the system uses the RSS queue depth as a hint as to how many connections to make using a particular NIC. The LinkSpeed member indicates a speed of the interface in bits per second. The SockAddr_Storage member indicates a network interface address for establishing connections using the interface. This field can use the well-known sockets structure SOCKADDR_STORAGE.

Figure 4:
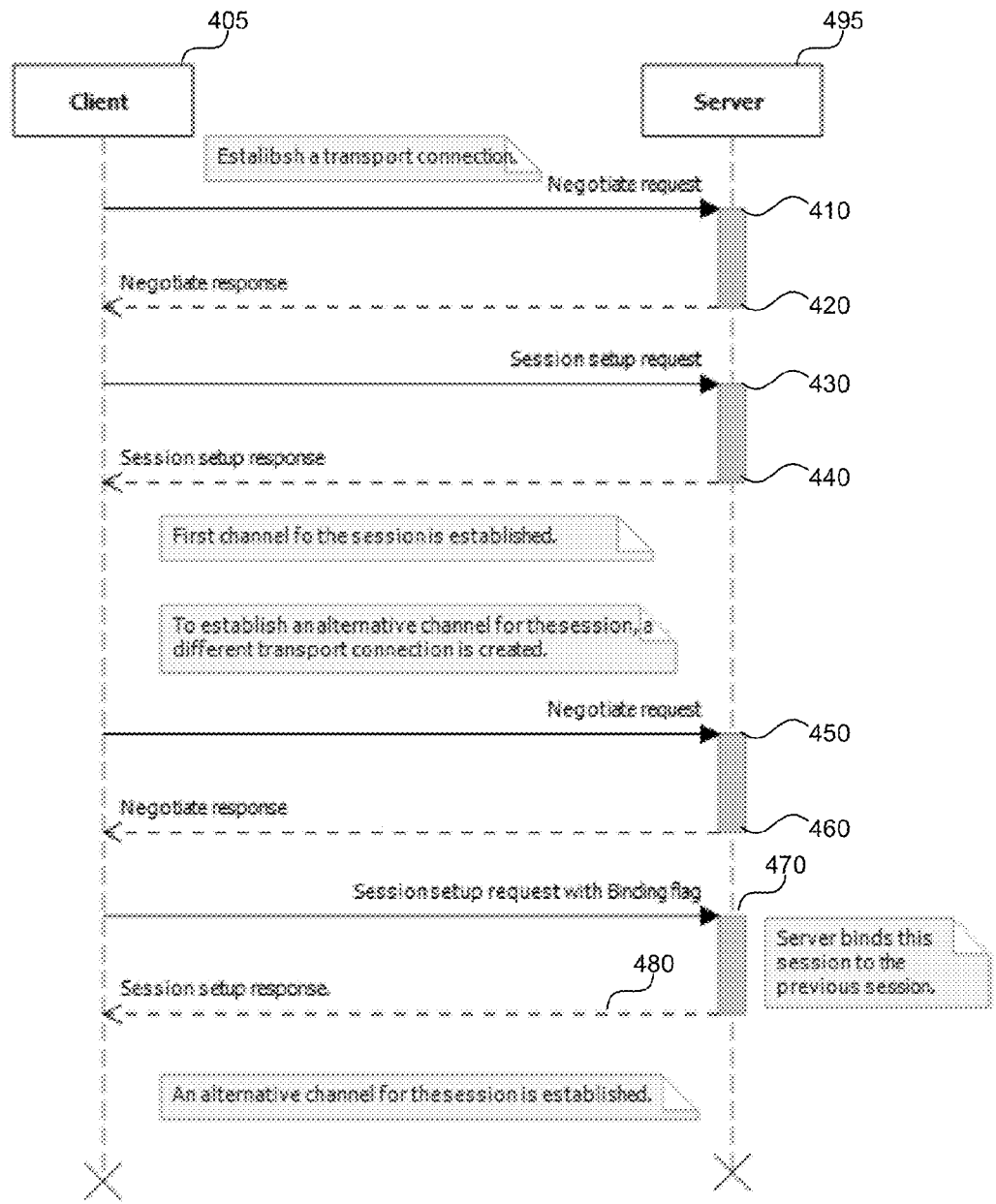
FIG. 4 is a network packet diagram that illustrates setup of multiple connections using the multi-connection information system, in one embodiment.

FIG. 4 is a network packet diagram that illustrates setup of multiple connections using the multi-connection information system, in one embodiment. In this example, a client 405 establishes multiple connections to a server 495 by sending the following packets (or multi-packet messages). The client 405 sends a first negotiate request 410 to the server 495. The server 495 responds with a negotiate response 420 to the client 405. The client 405 then sends a first session setup request 430 to the server 495. The server 495 responds with a session setup response 440 to the client 405. The session setup may make multiple round trips between the client and server. At this point, the first channel for the session is established and the client can begin sending commands to the server using the session. Subsequently (it may be immediate or some time later), the client 405 decides to establish a second connection to the server 495 for the same session. The client 405 sends a second negotiate request 450 over the new transport to the server 495. The server 495 responds with a negotiate response 460 to the client 405. The client 405 then sends a second session setup request 470 to the server 495. Unlike the first session setup request 430, this request 470 may include a binding flag that indicates to attach the new connection with the previous session. The server 495 responds with a session setup response 480 to the client 405. This session setup also may make multiple round trips between the client and the server. At this point, both connections are available to the client for sending commands to the server.

Figure 5:
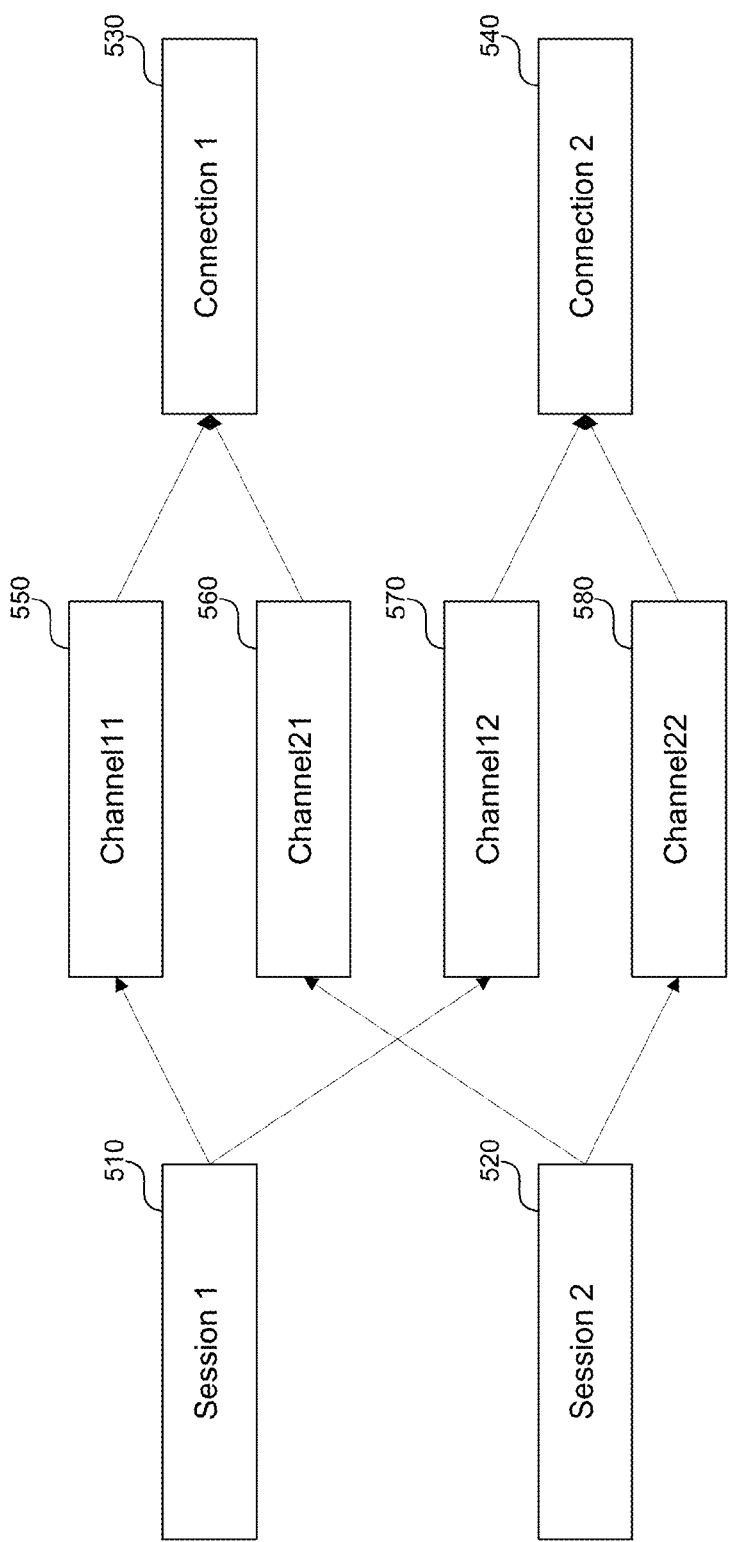
FIG. 5 is a block diagram that illustrates the potential many-to-many relationship between sessions and connections using the multi-channel information system, in one embodiment.

FIG. 5 is a block diagram that illustrates the potential many-to-many relationship between sessions and connections using the multi-channel information system, in one embodiment. The diagram includes a first session 510 and a second session 520. The diagram also includes a first connection 530 and a second connection 540. Traditionally, each session had a one-to-one relationship with a connection, such that the first session 510 would have been the only session using the first connection 530, and the second session 520 would have been the only session using the second connection 540. Using the techniques described herein, the concept of channels is introduced, whereby each session may use multiple connections and may even share connections with other sessions. Thus, as shown the first session 510 is bound to the first connection 530 through a first channel 550. The first session 510 is also bound to the second connection 540 through a second channel 560. Likewise, the second session 520 is bound to the first connection 530 through a third channel 570, and the second session 520 is bound to the second connection 540 through a fourth channel 580. Thus, either session can use either connection as dictated by application or implementation-specific preferences.

In some embodiments, the multi-connection information system does not inform the application of available connections. As noted herein, the system can be implemented at a layer between applications and a transport layer (e.g., TCP). For example, MICROSOFT™ WINDOWS™ provides an SMB implementation that applications can use. The system can perform the techniques described herein to automatically use multiple transports when available and to provide applications with higher reliability and throughput automatically, without input by the application. The system may allow the application to configure whether the capability is enabled. If the capability is on, the system may automatically pick the transports over which to establish connections and which transports to use for various commands from the application. In other embodiments, the system may provide more control to the application, so that the application can establish the criteria for selecting each connection or make the selection itself.

From the foregoing, it will be appreciated that specific embodiments of the multi-connection information system have been described herein for purposes of illustration, but that various modifications may be made without deviating from the spirit and scope of the invention. Accordingly, the invention is not limited except as by the appended claims.

We claim:

1. A computer-implemented method for initiating a session between a client and a server, the method comprising:
    receiving, from an application, a first request to initiate a Server Message Block (SMB) session between the client and the server;
    selecting a first transport for sending commands between the client and server;
    initiating the first connection between the client and the server via the first transport, wherein the first connection is bound to the SMB session;
    determining, using the first connection, at least one additional available transport; and
    selecting a second transport from the at least one additional available transport for initiating a second connection between the client and the server, wherein the second transport is selected from the at least one additional available transport based, at least in part, on one or more characteristics associated with the server, wherein initiating the second connection comprises sending a second request to establish the second connection, the second request comprising a binding flag that indicates that the second connection is attached to the SMB session.

2. The method of claim 1 wherein receiving the first request comprises setting up a session and sending one or more packets to the server to negotiate available dialects of a network protocol used to communicate between the client and server.

3. The method of claim 1 wherein receiving the first request comprises querying the server to determine whether the server supports multi-connection sessions.

4. The method of claim 1 wherein determining at least one additional available transport comprises querying a domain name system (DNS) server to identify one or more addresses of the server.

5. The method of claim 1 wherein determining at least one additional available transport comprises querying a client operating system to identify available network interfaces.

6. The method of claim 1 wherein determining at least one additional available transport comprises sending a capabilities request to the server to identify available network interfaces on the server.

7. The method of claim 1 wherein selecting the first transport comprises selecting the first transport based, at least in part, on application-specified criteria that establishes the connection preferences of the application.

8. The method of claim 1 further comprising preparing the first connection for use by the session for sending commands from the client to the server.

9. The method of claim 1 further comprising storing information for cleaning up one or more of the session, the first connection and the second connection.

10. The method of claim 1 further comprising initiating the second connection using the second transport.

11. A computer system for providing multichannel connections in file system sessions, the system comprising:
    a processor and memory configured to execute software instructions embodied within the following components:
        a session initiation component that receives requests to initiate a Server Message Block (SMB) session between a client and a server for sharing one or more resources; and
        a channel selection component that selects a first connection transport to initiate a first connection bond to the SMB session between the client and the server, wherein the channel selection component is further configured to select at least one additional transport that is discovered by a channel discovery component using the first connection, wherein the at least one additional transport is used to initiate a second connection between the client and the server using a binding flag that indicates the second connection is attached to the SMB session, and wherein the at least one additional transport is selected based, at least in part, on one or more characteristics associated with the server.

12. The system of claim 11 wherein the session initiation component is further configured to receive a request from an application running on the client that identifies the server to which the application wants to connect to access files or other resources.

13. The system of claim 11 wherein the channel discovery component is further configured to determine whether a connection transport supports Remote Direct Memory Access (RDMA) and/or Receive Scaling Support (RSS).

14. The system of claim 11 further comprising a binding component configured to:
associate the first connection and the second connection to the session; and capture information about a security principal associated with a particular series of communications between the client and server and associate that information with the session.

15. The system of claim 11 further comprising a command routing component configured to determine whether to send a command over the first connection or the second connection.

16. The system of claim 15 wherein the command routing component is further configured to split a command and use multiple transports to carry out the split command to increase throughput.

17. The system of claim 11 further comprising a failover handling component that handles a disconnection of a particular transport connection from the session by routing subsequent commands to one or more still-connected transports and by replaying any commands not carried out on the disconnected transport connection on a still-connected transport connection.

18. A computer-readable storage device comprising instructions for adding a connection to a previously established session that includes a first connection between a client and a server, wherein the instructions, upon execution, cause a processor to perform a method, the method comprising:
detecting a condition for establishing an additional connection, different from the first connection, in the previously established Server Message Block (SMB) session, wherein the condition is associated with the first connection, and wherein the first connection is bound to the previously established SMB session;
determining, using the first connection, at least one additional available transport;
selecting an additional transport from the at least one additional available transport; and
initiating the additional connection between the client and the server via the additional transport, wherein initiating the additional connection comprises sending a request to initiate the additional connection, the request comprising a binding flag that indicates that the additional connection is attached to the previously established SMB session.

19. The computer-readable storage device of claim 18 wherein determining at least one additional available transport comprises querying a domain name system (DNS) server to identify one or more addresses of the server.

20. The computer-readable storage device of claim 18 wherein determining at least one additional available transport comprises sending a capabilities request to the server to identify available network interfaces on the server.

\* \* \* \* \*